US009179373B2

(12) United States Patent
Swaminathan et al.

(10) Patent No.: US 9,179,373 B2
(45) Date of Patent: Nov. 3, 2015

(54) METHOD AND APPARATUS THAT FACILITATES REDIRECTING WIRELESS TERMINALS BETWEEN WIRELESS NETWORKS

(75) Inventors: Arvind Swaminathan, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 12/841,960

(22) Filed: Jul. 22, 2010

(65) Prior Publication Data

US 2011/0176436 A1 Jul. 21, 2011

Related U.S. Application Data

(60) Provisional application No. 61/227,896, filed on Jul. 23, 2009.

(51) Int. Cl.
*H04W 4/00* (2009.01)
*H04W 36/00* (2009.01)
(Continued)

(52) U.S. Cl.
CPC ...... *H04W 36/0061* (2013.01); *H04W 36/0083* (2013.01); *H04W 36/14* (2013.01); *H04W 36/30* (2013.01)

(58) Field of Classification Search
USPC ............... 455/412, 168.1, 188.1, 418, 422.1, 455/432.1, 432.3, 434, 435.1–435.3, 436, 455/440, 444, 450, 452.1–452.2; 370/328–331, 336–339, 341–345, 437, 370/480–482, 491
See application file for complete search history.

(56) References Cited

U.S. PATENT DOCUMENTS 5,509,051 A * 4/1996 Barnett et al. ................ 455/443
6,567,665 B1 * 5/2003 Kissee .......................... 455/436
(Continued)

FOREIGN PATENT DOCUMENTS

EP 1081978 3/2001
EP 1109418 A2 6/2001
(Continued)

OTHER PUBLICATIONS

Holma, H., et al., "WCMDA for UMTS, the Radio Resource Control Protocol", Jan. 1, 2001, WCDMA for UMTS: Radio Access for Third Generation Mobile Communications, Chichester: John Wiley and Sons, GB, p. 135-151, XP002254288.

(Continued)

*Primary Examiner* — Zewdu A Beyen
(74) *Attorney, Agent, or Firm* — Anthony R. Morris

(57) ABSTRACT

Aspects are described for redirecting wireless terminals between wireless networks. In a first embodiment, a coverage quality of user equipment within a first wireless network is monitored. Multiple candidate frequencies are then ascertained in response to the coverage quality to facilitate a communication between the user equipment and a second wireless network. The candidate frequencies are then communicated to the user equipment. In another embodiment, an indication of a plurality of candidate frequencies is received, and a failure in performing a handover from a first wireless network to a second wireless network is detected. For this embodiment, the handover is attempted via a primary frequency. An alternative frequency is then selected from the plurality of candidate frequencies in response to the failure, and a communication with the second wireless network is established via the alternative frequency.

23 Claims, 12 Drawing Sheets

(51) Int. Cl.
*H04W 36/14* (2009.01)
*H04W 36/30* (2009.01)

(56) References Cited

U.S. PATENT DOCUMENTS

| | | |
|---|---|---|
| 2006/0116127 A1 | 6/2006 | Wilhoite et al. |
| 2008/0020745 A1* | 1/2008 | Bae et al. .................. 455/422.1 |
| 2008/0025263 A1* | 1/2008 | Pelkonen ..................... 370/332 |
| 2008/0273497 A1* | 11/2008 | Lu et al. ...................... 370/331 |
| 2008/0318574 A1 | 12/2008 | Bi |
| 2009/0073892 A1* | 3/2009 | Tolli et al. ................... 370/252 |
| 2012/0201227 A1* | 8/2012 | Zhu et al. ..................... 370/332 |
| 2012/0276907 A1* | 11/2012 | Tod et al. ..................... 455/437 |

FOREIGN PATENT DOCUMENTS

| | | |
|---|---|---|
| WO | WO9633589 A2 | 10/1996 |
| WO | WO2004025983 A1 | 3/2004 |

OTHER PUBLICATIONS

International Search Report and Written Opinion—PCT/US2010/043161—ISA—EPO—Nov. 2, 2010.
Taiwan Search Report—TW099124374—TIPO—May 8, 2013.

\* cited by examiner

METHOD AND APPARATUS THAT FACILITATES REDIRECTING WIRELESS TERMINALS BETWEEN WIRELESS NETWORKS

CROSS-REFERENCE TO RELATED APPLICATIONS

This application claims the benefit of U.S. Provisional Patent Application Ser. No. 61/227,896 entitled "METHOD AND APPARATUS TO IMPROVE RELIABILITY AND LATENCY OF REDIRECTION FROM LTE-1X AND LTE-HRPD," which was filed Jul. 23, 2009. The aforementioned application is herein incorporated by reference in its entirety.

BACKGROUND

I. Field

The following description relates generally to wireless communications, and more particularly to redirecting user equipment from long term evolution networks.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, Third Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

With respect to LTE networks, it is noted that initial LTE deployments by 3GPP operators will be in pockets. As a result, the user equipment (UE) might run out of LTE coverage while active on the LTE network and will have to move to a High Rate Packet Data (HRPD)/1X network to continue service. In addition, initial LTE deployments will not support a voice-over-internet-protocol (VoIP). One solution being proposed is for the UE to fallback to the 1X network for making and receiving voice calls (referred to as 1XCSFB).

Initial LTE networks will use a redirection based approach to move the UE to HRPD/1X upon recognizing that the UE is moving out of LTE coverage. This command currently specifies a single band/channel in which the target radio access technology (RAT) will be found. A similar redirection command is used in 1XCSFB. The current structure of the current redirection message, however, only allows the LTE network to specify a single frequency. Having a single frequency in the redirection message can lead to several reliability issues. For example, since the single specified carrier could experience a fade while another carrier has good coverage in the UE's current location, it has been shown to decrease handover reliability. Using just one frequency thus fails to exploit the operator's universal data-optimized (DO)/1X coverage. Also, since LTE is deployed in a lower frequency, a single LTE cell might span multiple DO/1X cells. In this case the best sectors/frequency will vary considerably depending on the UE's location in the LTE cell. Specifying a single frequency will be even more suboptimal in terms of reliability in this case.

Specifying a single frequency also undesirably adds to delay. For example, many UEs may have to hash-to another frequency after acquiring the DO/1X system on the single redirected frequency. Also, after moving to the frequency, the UE may have to update its overhead message, which prevents optimizations like cached overhead messages.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present concepts of one or more embodiments in a simplified form as a prelude to the more detailed description that is presented later.

In accordance with one or more embodiments and corresponding disclosure thereof, various aspects are described in connection with providing user equipment with multiple frequencies for performing a redirection between wireless networks. Various embodiments are disclosed which facilitate providing these multiple frequencies to the user equipment. For instance, in a particular embodiment, it is contemplated that such multiple frequencies are provided to the user equipment in a redirection message. In another embodiment, however, the multiple frequencies are provided to the user equipment via a system information block (e.g., an SIB-8) during the user equipment's idle mode. It is also contemplated that the multiple frequencies may be prioritized to facilitate selecting a particular frequency from the multiple frequencies. Moreover, embodiments are disclosed for selecting a particular frequency in response to a reconnect failure via an initial frequency provided in a "single-frequency" redirection message. For instance, a most recently used determination may be implemented, wherein a most recently used frequency is selected in response to such failure.

In one aspect, methods and computer program products are disclosed that facilitate redirecting wireless terminals between wireless networks. Such embodiments include monitoring a coverage quality of a user equipment within a first wireless network, and ascertaining a plurality of candidate frequencies in response to the coverage quality. For these embodiments, a communication between the user equipment and a second wireless network is facilitated by the plurality of candidate frequencies. These embodiments also further include communicating the plurality of candidate frequencies to the user equipment.

Another aspect relates to an apparatus configured to facilitate redirecting wireless terminals between wireless networks. The apparatus includes a processor configured to execute computer executable components stored in memory. The computer executable components include a monitoring component, a selection component, and a communication component. The monitoring component is configured to monitor a coverage quality of a user equipment within a first wireless network, whereas the selection component is configured to ascertain a plurality of candidate frequencies in response to the coverage quality. For this embodiment, a communication between the user equipment and a second wireless network is facilitated by the plurality of candidate frequencies, wherein the communication component is configured to communicate the plurality of candidate frequencies to the user equipment.

Additional aspects relate to an apparatus that includes means for monitoring, means for ascertaining, and means for communicating. The means for monitoring monitors a coverage quality of a user equipment within a first wireless network, whereas the means for ascertaining ascertains a plurality of candidate frequencies in response to the coverage quality. For this embodiment, a communication between the user equipment and a second wireless network is facilitated by the plurality of candidate frequencies, wherein the means for communicating communicates the plurality of candidate frequencies to the user equipment.

In another aspect, other methods and computer program products are disclosed that facilitate redirecting wireless terminals between wireless networks. Such embodiments include receiving an indication of a plurality of candidate frequencies, and detecting a failure in performing a handover from a first wireless network to a second wireless network, wherein the handover is attempted via a primary frequency. These embodiments further include selecting an alternative frequency from the plurality of candidate frequencies in response to the failure, and establishing a communication with the second wireless network via the alternative frequency.

Yet another aspect relates to an apparatus that facilitates redirecting wireless terminals between wireless networks. The apparatus includes a processor configured to execute computer executable components stored in memory. The computer executable components include a receiving component, a detection component, a selection component, and a handover component. The receiving component is configured to receive an indication of a plurality of candidate frequencies, whereas the detection component configured to detect a failure in performing a handover from a first wireless network to a second wireless network. For this embodiment, the handover is attempted via a primary frequency. The selection component is then configured to select an alternative frequency from the plurality of candidate frequencies in response to the failure, whereas the handover component is configured to establish a communication with the second wireless network via the alternative frequency.

Additional aspects relate to an apparatus that includes means for receiving, means for detecting, means for selecting, and means for establishing. The means for receiving receives an indication of a plurality of candidate frequencies, whereas the means for detecting detects a failure in performing a handover from a first wireless network to a second wireless network. For this embodiment, the handover is attempted via a primary frequency. The means for selecting then selects an alternative frequency from the plurality of candidate frequencies in response to the failure, whereas the means for establishing establishes a communication with the second wireless network via the alternative frequency.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
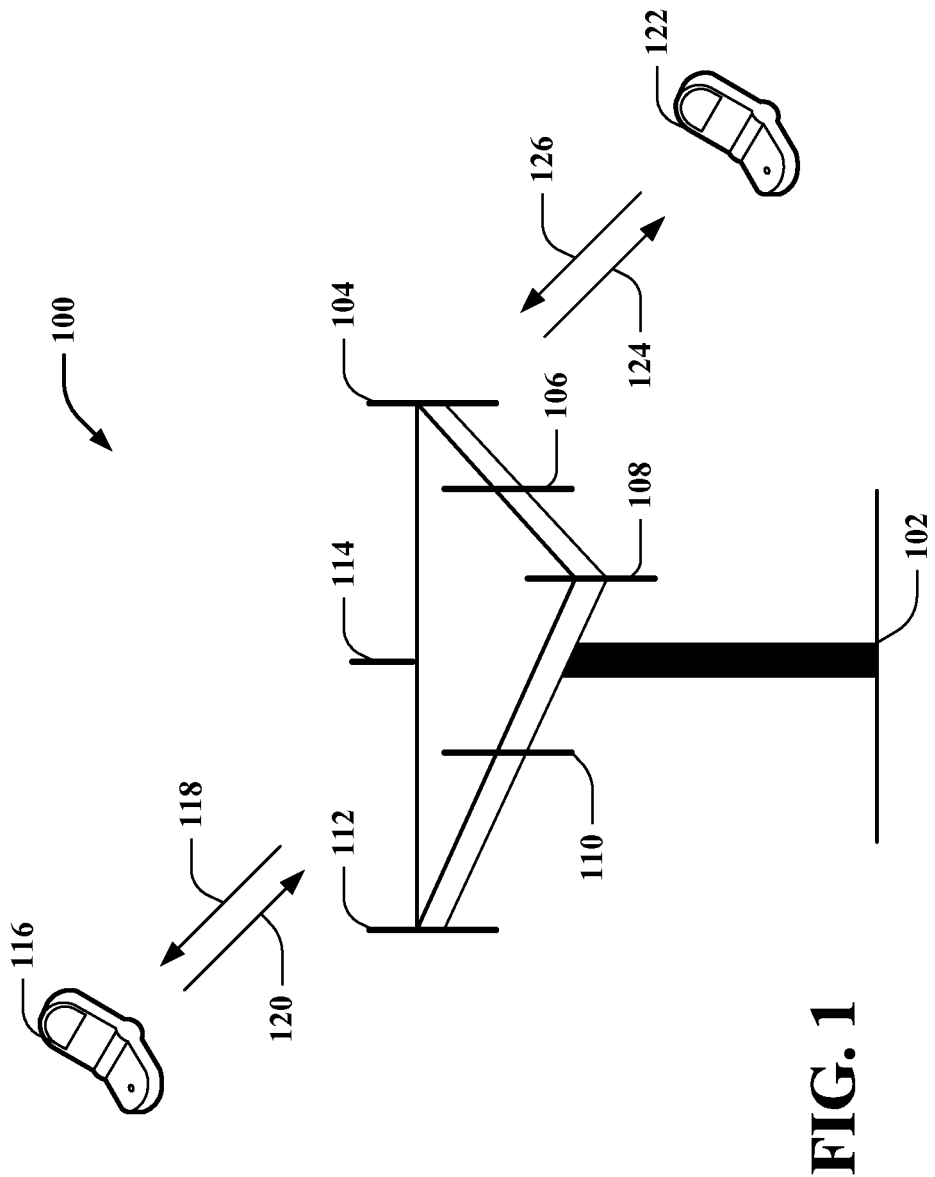
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Techniques for redirecting wireless terminals between wireless networks are described herein. In a first embodiment, multiple candidate frequencies for facilitating such redirection are included in a redirection message provided to a wireless terminal. In another embodiment, candidate frequencies are provided to a wireless terminal during an idle mode via a system information block.

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocolsallow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

Referring now to the drawings, FIG. 1 illustrates a wireless communication system in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Using beamforming to transmit to access terminals scattered randomly through an associated coverage can also reduce interference to access terminals in neighboring cells.

Figure 2:
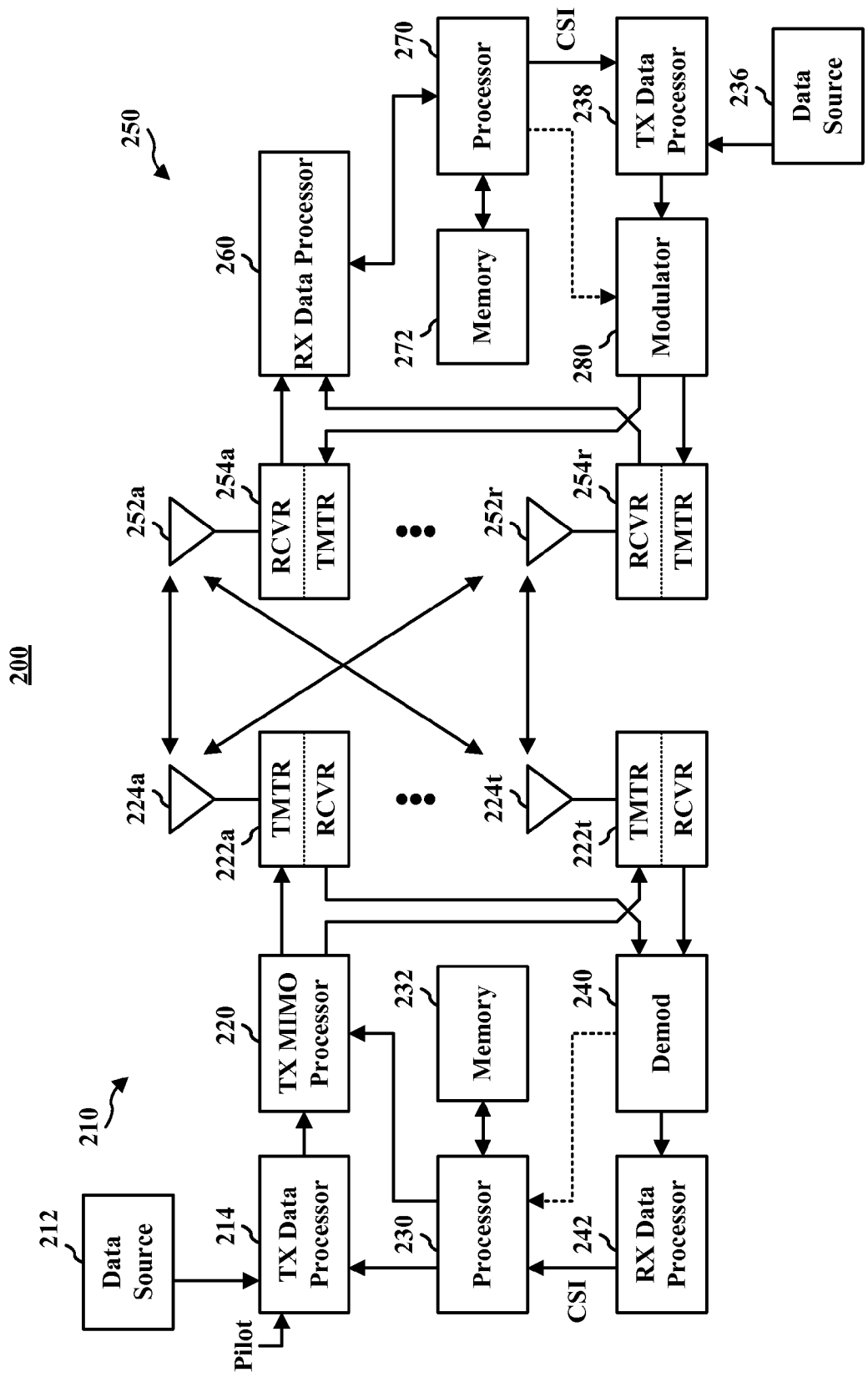
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from the exemplary base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link (e.g., channel state information (CSI)) and/or the received data stream. The reverse link message can be processed by a TX data processor 238, which also receives traffic data for a number of data streams from a data source 236, modulated by a modulator 280, conditioned by transmitters 254a through 254r, and transmitted to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
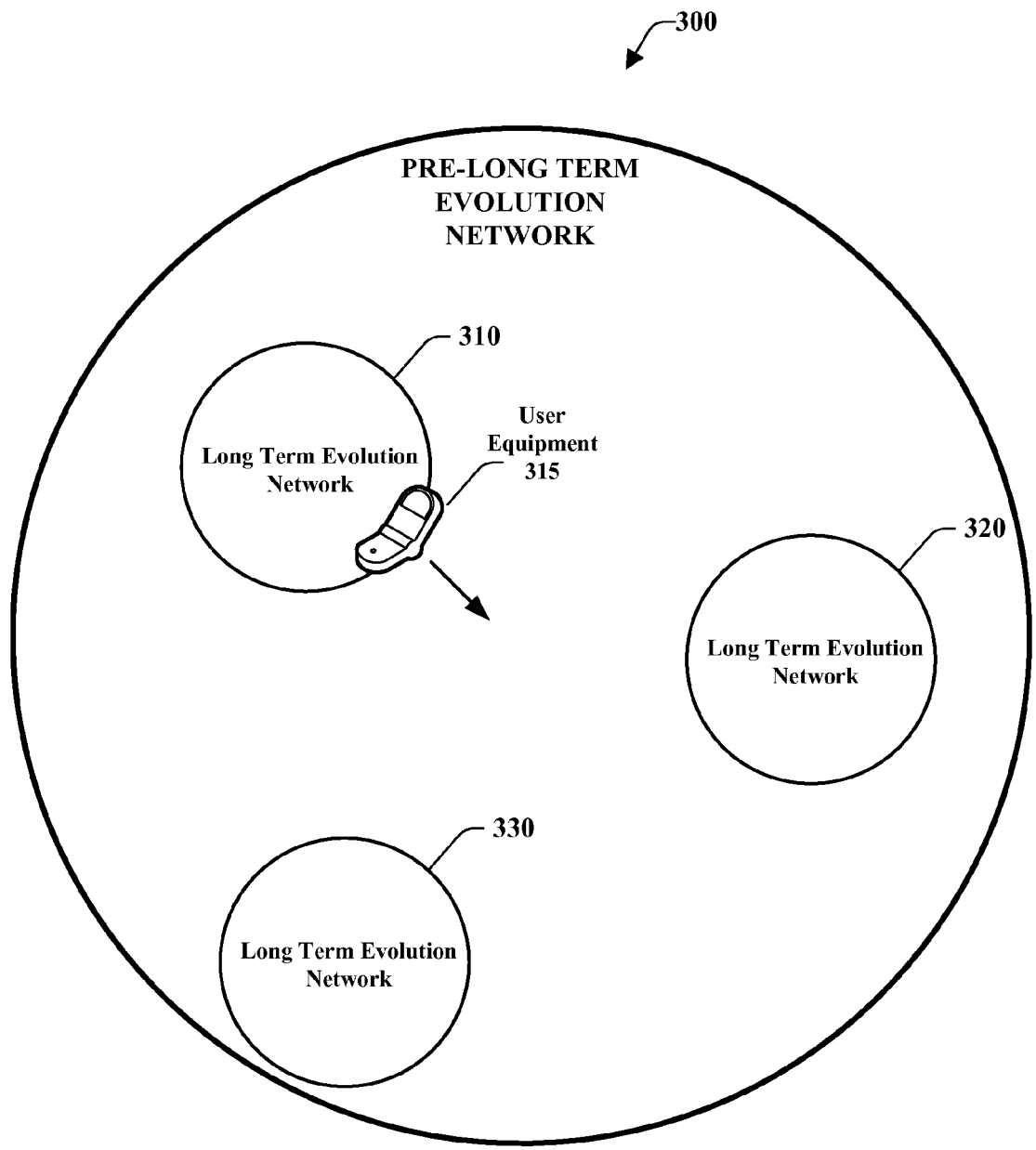
FIG. 3 illustrates an exemplary multi-network environment that facilitates various aspects disclosed herein.

Various aspects directed towards providing wireless terminals with multiple frequencies to facilitate redirections between wireless networks are now described. To this end, it is first noted that several 3GPP2 operators are deploying LTE as their fourth generation technology, wherein the 3GPP2 operator may, for example, have a 1X network, an HRPD network, and an LTE network. In FIG. 3, an exemplary multi-network environment is provided that facilitates various aspects disclosed herein. As illustrated, initial LTE deployments will be in pockets, wherein the pockets for this particular example are within pre-long term evolution network 300 (e.g., a 1X network, an HRPD network, etc.) and include LTE network 310, LTE network 320, and LTE network 330. As a result, a UE 315 might run out of LTE coverage while active on LTE network 310 and will have to move to pre-long term evolution network 300 to continue service.

In the initial LTE deployments, when LTE network 310 recognizes that user equipment 315 is moving out of LTE coverage, LTE network 310 will issue a redirection command to user equipment 315 directing it to move to pre-long term evolution network 300 (e.g., a 1X network or an HRPD network). In an aspect, this command specifies the target RAT and a single band/channel in which the target RAT will be found. This kind of handover is called a non-optimized handover. In 1XCSFB, LTE network 310 will redirect user equipment 315 to a 1X system to make/receive a voice call, wherein the redirection message specifies a single band/channel in which the 1X system can be found.

The structure of the current redirection message, however, only allows LTE network 310 to specify a single frequency. Furthermore, under current specifications, this single frequency is sent to all mobiles in an LTE cell regardless of which part of the cell user equipment 315 is located.

It is also noted that having a single frequency in the redirection message may lead to several reliability issues. For instance, since DO/1X sectors typically use multiple carriers, even if the "best" 1X/DO sectors do not change within an LTE cell, it is possible that a certain carrier deployed by a DO/1X sector might be in a fade in the mobile's current location, while another carrier has adequate coverage. As a result, using a pre-determined frequency without measurements has been shown to decrease handover reliability and increase the number of "coverage holes". Also, since LTE is deployed in a lower frequency, a single LTE cell might span multiple 1X/DO cells. In this case the best sectors/frequency will vary considerably depending on the location of user equipment 315 in the LTE cell. Specifying a single frequency will be even more sub-optimal in terms of reliability in this case.

If due to the aforementioned reasons user equipment 315 fails to acquire service in the single frequency specified in the redirection message, user equipment 315 will declare failure and will have to resort to out-of-service scans. The system selection algorithms will most likely result in the mobile selecting the original LTE system (i.e., LTE network 310) as part of this process (since LTE is typically the highest priority RAT and also since the LTE frequency is the most-recently used frequency). If this happens, the user equipment 315 will acquire LTE network 310. However, since it is at the edge of LTE coverage, user equipment 315 will most likely be redirected again.

As stated previously, specifying a single frequency also adds to the delay before user equipment 315 can continue data transfer (if redirection is to DO) or start/receive voice call (if the redirection is for 1XCSFB). For instance, if multiple carriers are used by the DO/1X sector, user equipment 315 will have to hash to the right frequency after moving to 1X. Hence, if a single frequency is sent in the redirection message, many mobiles will have to hash-to another frequency after connecting to the 1X/DO system on the redirected frequency. Also, after moving to the frequency, the mobile will have to update its overhead message. A single frequency implementation thus prevents optimizations like cached overhead message.

Embodiments described in detail herein increase reliability and decrease delay. These solutions do not require any complicated network changes or UE implementation changes. Hence, they may be deployed immediately. In addition, solutions presented herein allow UE specific algorithms (like using most recently used (MRU) frequency list, cached information, etc.) to improve reliability and decrease delay.

In one embodiment, the redirection message used in LTE is enhanced to support multiple frequencies. If multiple frequencies can be specified in the redirection message, the reliability can be readily improved. For instance, since most 3GPP2 operator have almost-universal 1X/DO coverage, the UE can get service in most places on at least one carrier. Hence, if the LTE network includes multiple frequencies in the redirection message based on the 1X/DO sectors in its vicinity, the probability of the UE not acquiring service in any of the frequencies is very small. Also, if multiple frequencies are specified, the UE can use proprietary algorithms to increase reliability. For instance micro-scans and most recently used frequencies can be used. Moreover, such techniques can achieve increased reliability while avoiding scanning all frequencies in the redirection message.

Specifying multiple frequencies also allows for the implementation of UE-specific algorithms to decrease latency. For instance, in the case of 1XCSFB, the UE can maintain the N frequencies in which it most recently acquired service, wherein it can re-order the received frequency list to search the MRU frequencies first. Also, if multiple frequencies can be specified, the UE can determine its hash-to-frequency and move to the correct frequency immediately, which reduces delay.

In a further aspect, another proprietary algorithm is disclosed, which reduces delay. For this embodiment, the UE maintains cached overhead information from the N recent sectors it found service on along with the frequency information. The UE can then prioritize the frequencies in the redirection message based on availability or un-availability of cached overhead information. Thus, by changing the format of the redirection message on LTE, improvements to reliability and latency are possible.

Alternatively, rather than specifying the multiple frequencies in the redirection message, it is contemplated that such frequencies may be provided via a system information block (SIB). For instance, when the UE is operating in idle mode, the UE may receive an SIB from the LTE network specifying the multiple frequencies. The UE may then begin a voice call via the LTE network, wherein the UE subsequently receives a single-frequency redirection message upon approaching the edge of the LTE network. The UE may then be configured to utilize the frequencies specified in the SIB if the single frequency specified in the redirection message fails. For this embodiment, it should again be noted that the frequencies specified in the SIB can be prioritized, wherein such prioritization can be performed by the UE and/or the LTE network.

Figure 4:
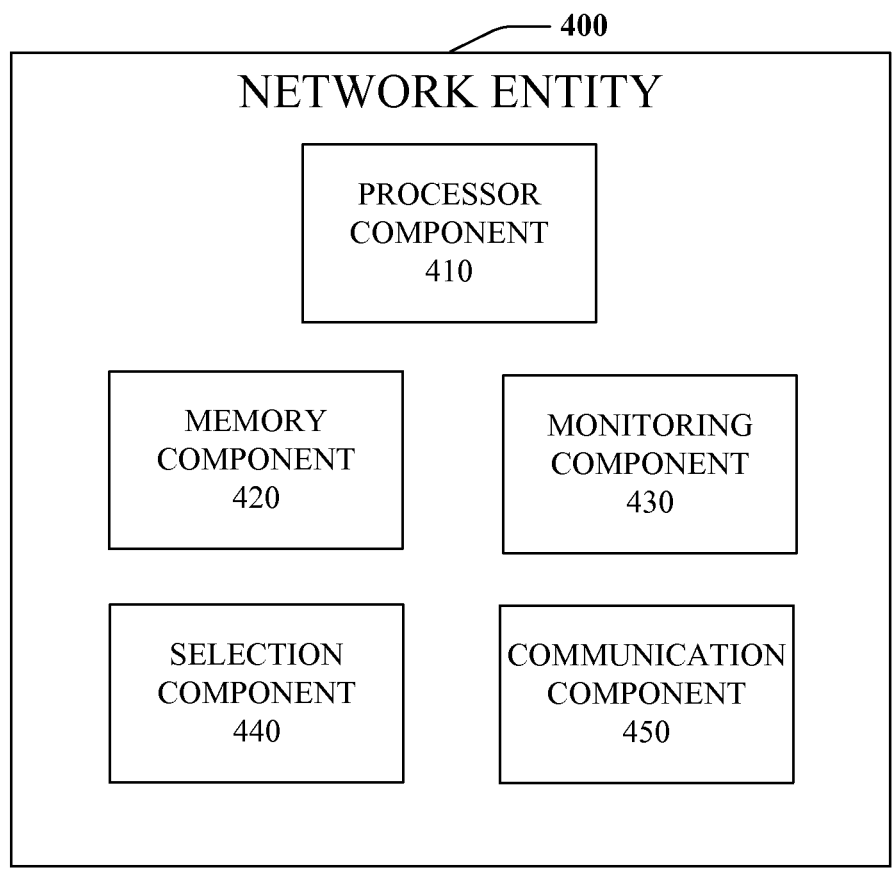
FIG. 4 illustrates a block diagram of an exemplary network entity that facilitates redirecting wireless terminals between wireless networks in accordance with an aspect of the subject specification.

Referring next to FIG. 4, an exemplary network entity that facilitates redirecting wireless terminals between wireless networks according to an embodiment is illustrated. As shown, network entity 400 may include processor component 410, memory component 420, monitoring component 430, selection component 440, and communication component 450. Here, it should be appreciated that network entity 400 may reside within any of a plurality of network entities including, for example, an evolved node B (eNB).

In one aspect, processor component 410 is configured to execute computer-readable instructions related to performing any of a plurality of functions. Processor component 410 can be a single processor or a plurality of processors which analyze information to be communicated from network entity 400 and/or generate information that is utilized by memory component 420, monitoring component 430, selection component 440, and/or communication component 450. Additionally or alternatively, processor component 410 may be configured to control one or more components of network entity 400.

In another aspect, memory component 420 is coupled to processor component 410 and configured to store computer-readable instructions executed by processor component 410. Memory component 420 may also be configured to store any of a plurality of other types of data including generated by any of monitoring component 430, selection component 440, and/or communication component 450. Memory component 420 can be configured in a number of different configurations, including as random access memory, battery-backed memory, hard disk, magnetic tape, etc. Various features can also be implemented upon memory component 420, such as compression and automatic back up (e.g., use of a Redundant Array of Independent Drives configuration).

As illustrated, network entity 400 may further include monitoring component 430. Within such embodiment, monitoring component 430 may be configured to monitor a coverage quality of user equipment within a first wireless network. In an aspect, it is contemplated that the first wireless network is a long term evolution network. Furthermore, it should be noted that monitoring component 430 may be configured to monitor coverage quality in any of a plurality of way. For instance, monitoring component 430 may be configured to evaluate a set of measurements received from the user equipment, wherein the set of measurements may, for example, be associated with Channel Quality Indicator measurements.

In another aspect, network entity 400 includes selection component 440, which is configured to ascertain a plurality of candidate frequencies in response to the coverage quality. Here, it should be noted that a communication between the user equipment and a second wireless network is facilitated by the plurality of candidate frequencies. In an aspect, it is contemplated that the second wireless network is a third generation network. Furthermore, it should be noted that selection component 440 may be further configured to prioritize the plurality of candidate frequencies. For instance, in a particular embodiment, selection component 440 is configured to prioritize the candidate frequencies based on a most recently used determination of those candidate frequencies. Moreover, for this particular embodiment, selection component 440 may be configured to utilize the most recently used determination to select a most recently used frequency in response to a failure of an initial frequency included in a redirection message.

In yet another aspect, network entity 400 includes communication component 450, which is coupled to processor component 410 and configured to interface network entity 400 with external entities. For instance, communication component 430 may be configured to communicate the plurality of candidate frequencies to the user equipment. In a particular embodiment, communication component 450 is configured to include the plurality of candidate frequencies within a redirection message. In another embodiment, however, communication component 450 is configured to include the plurality of candidate frequencies within a system information block. Within such embodiment, it is contemplated that the system information block may be communicated during an idle mode of the user equipment. It is further contemplated that the system information block may be a type eight system information block (SIB-8).

In an aspect, to preserve network resources, network entity 400 may strategically determine and/or communicate the candidate frequencies only under particular circumstances. For instance, in a particular embodiment, monitoring component 430 is configured to compare the coverage quality to a threshold. Within such embodiment, selection component 440 may be configured to determine the plurality of candidate frequencies in response to the coverage quality falling below the threshold. Similarly, communication component 450 may be configured to communicate the plurality of candidate frequencies in response to the coverage quality falling below the threshold.

Figure 5:
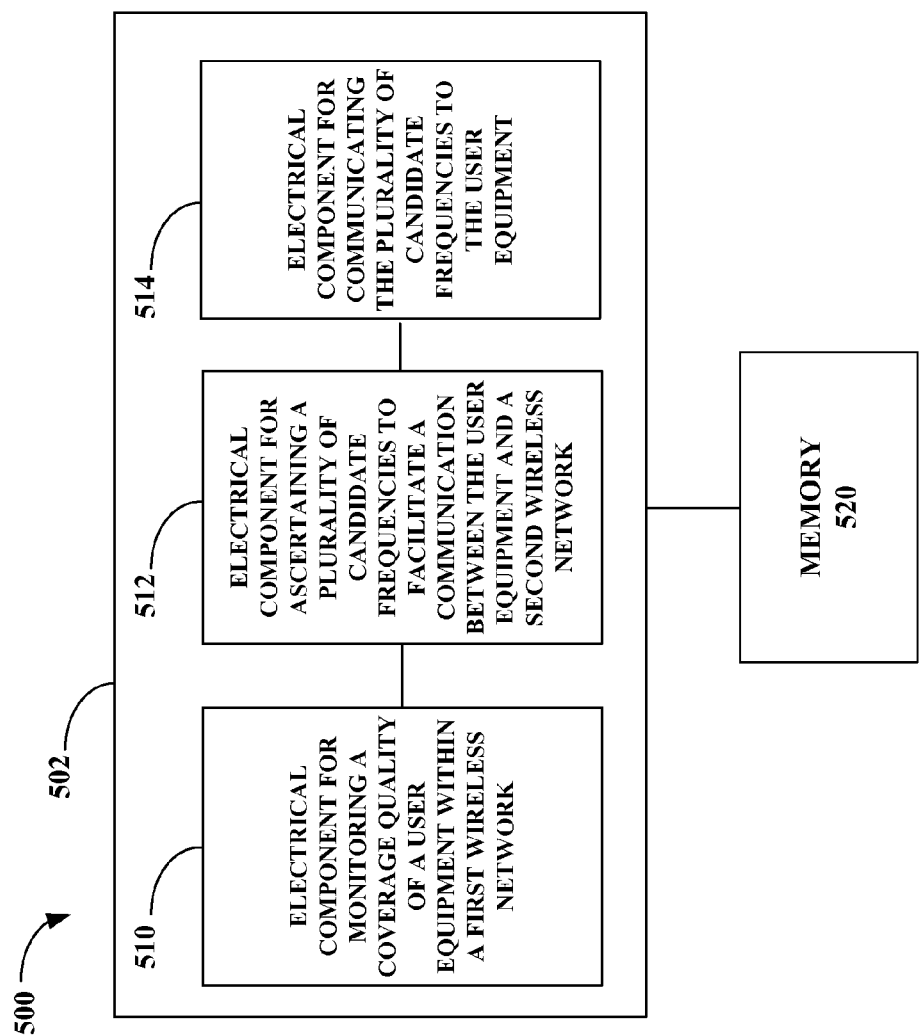
FIG. 5 is an illustration of a first exemplary coupling of electrical components that effectuate redirecting wireless terminals between wireless networks according to an embodiment.

Turning to FIG. 5, illustrated is a system 500 that facilitates redirecting wireless terminals between wireless networks according to an embodiment. System 500 and/or instructions for implementing system 500 can reside within a base station (e.g., network entity 400). As depicted, system 500 includes functional blocks that can represent functions implemented by a processor using instructions and/or data from a computer readable storage medium. System 500 includes a logical grouping 502 of electrical components that can act in conjunction. As illustrated, logical grouping 502 can include an electrical component for monitoring a coverage quality of a user equipment within a first wireless network 510. Furthermore, logical grouping 502 can include an electrical component for ascertaining a plurality of candidate frequencies to facilitate a communication between the user equipment and a second wireless network 512. Logical grouping 502 can also include an electrical component for communicating the plurality of candidate frequencies to the user equipment 514. Additionally, system 500 can include a memory 520 that retains instructions for executing functions associated with electrical components 510, 512, and 514. While shown as being external to memory 520, it is to be understood that electrical components 510, 512, and 514 can exist within memory 520.

Figure 6:
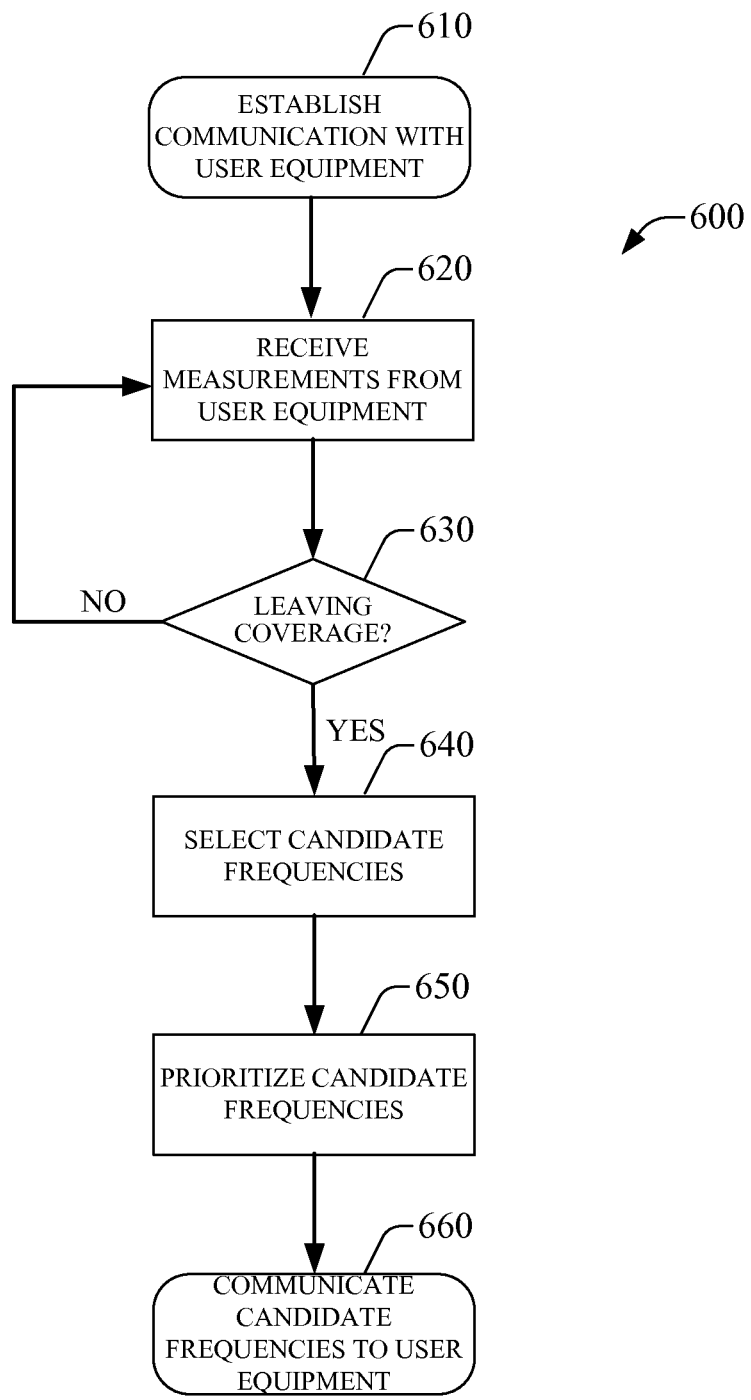
FIG. 6 is a flow diagram of a first exemplary methodology for redirecting wireless terminals between wireless networks in accordance with an aspect of the subject specification.

Referring next to FIG. 6, a flow chart illustrating an exemplary method for facilitating a redirection of wireless terminals between wireless networks is provided. As illustrated, process 600 includes a series of acts that may be performed within a base station (e.g., network entity 400) according to an aspect of the subject specification. For instance, process 600 may be implemented by employing a processor to execute computer executable instructions stored on a computer readable storage medium to implement the series of acts. In another embodiment, a computer-readable storage medium comprising code for causing at least one computer to implement the acts of process 600 are contemplated.

In an aspect, process 600 begins with a communication with user equipment being established at act 610. At act 620, process 600 continues with the network entity receiving measurements from the user equipment. As mentioned previously, it is contemplated that such measurements are any of a plurality of measurement types including, for example, Channel Quality Indicator measurements.

Based on the measurements received from the user equipment, process 600 then proceeds to act 630 where the network entity determines whether the user equipment is leaving a particular coverage area. For instance, since pockets of LTE networks are currently deployed within third generation networks, act 630 may include ascertaining whether the user equipment is leaving an LTE network. To this end, it should be noted that the determination performed at act 630 may be implemented in any of a plurality of ways. For example, act 630 may include ascertaining a coverage quality metric based on the received measurements, and comparing the coverage quality metric to a threshold value.

If the network entity determines that the user equipment is not leaving a particular coverage area, process 600 loops back to act 620 where measurements continue to be received from the user equipment. Otherwise, if the network entity determines that the user equipment is indeed leaving the particular coverage area, process 600 proceeds to act 640 where candidate frequencies are determined for performing a handover to another network (e.g., a handover from an LTE network to a third generation network).

In an aspect, the candidate frequencies identified in act 640 can be distinguished from each other based on an anticipated performance. In a particular embodiment, act 650 includes prioritizing the candidate frequencies according to such anticipated performance. Indeed, act 650 may include evaluating the candidate frequencies according to any of a plurality of factors (e.g., reliability, most recently used, etc.), wherein the candidate frequencies are then prioritized accordingly. Once the candidate frequencies are prioritized, process 600 then concludes at act 660 where the candidate frequencies are communicated to the user equipment.

Figure 7:
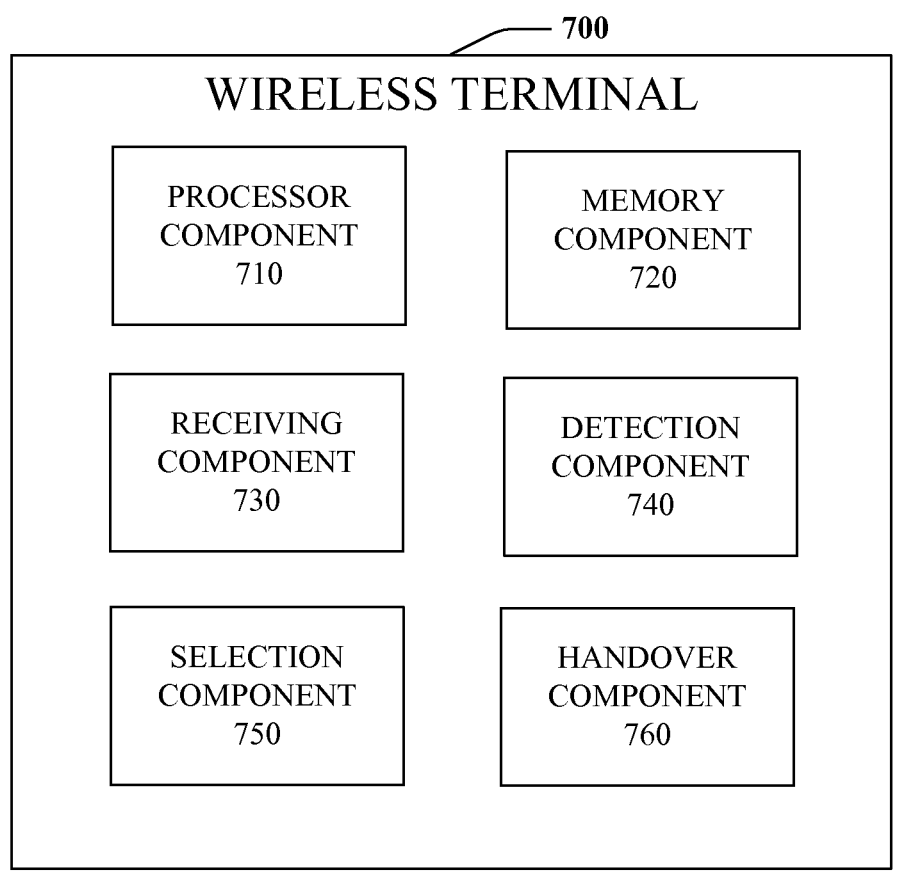
FIG. 7 illustrates a block diagram of an exemplary wireless terminal that facilitates redirecting wireless terminals between wireless networks in accordance with an aspect of the subject specification.

Referring next to FIG. 7, an exemplary wireless terminal that facilitates redirecting wireless terminals between wireless networks according to an embodiment is illustrated. As shown, wireless terminal 700 may include processor component 710, memory component 720, receiving component 730, detection component 740, selection component 750, and handover component 760.

Similar to processor component 410 in network entity 400, processor component 710 is configured to execute computer-readable instructions related to performing any of a plurality of functions. Processor component 710 can be a single processor or a plurality of processors which analyze information to be communicated from wireless terminal 700 and/or generate information that is utilized by memory component 720, receiving component 730, detection component 740, selection component 750, and/or handover component 760. Additionally or alternatively, processor component 710 may be configured to control one or more components of wireless terminal 700.

In another aspect, memory component 720 is coupled to processor component 710 and configured to store computer-readable instructions executed by processor component 710. Memory component 720 may also be configured to store any of a plurality of other types of data including generated by any of receiving component 730, detection component 740, selection component 750, and/or handover component 760. Here, it should be noted that memory component 720 is analogous to memory component 420 in network entity 400. Accordingly, it should be appreciated that any of the aforementioned features/configurations of memory component 420 are also applicable to memory component 720.

As illustrated, wireless terminal 700 may also include receiving component 730. Within such embodiment, receiving component 730 may be configured to receive an indication of a plurality of candidate frequencies. Here, it should be appreciated that the indication could be provided in any of various forms. For instance, in a particular embodiment, the indication is included within a redirection message. In another embodiment, however, the indication is included within a system information block. Within such embodiment, it is contemplated that receiving component 730 may be configured to receive the system information block during an idle mode. It is further contemplated that the system information block may be a type eight system information block (SIB-8).

In another aspect, wireless terminal 700 includes detection component 740, which is configured to detect a failure in performing a handover from a first wireless network to a second wireless network. Here, for some embodiments, it is contemplated that the first wireless network is a long term evolution network, and that the second wireless network is a third generation network. It is further contemplated that detection component 740 may be configured to attempt the aforementioned handover via a primary frequency. To this end, it is noted that such primary frequency may be communicated to wireless terminal 700 in any of a plurality of ways including, for example, via a redirection message and/or a system information block.

As illustrated, wireless terminal 700 may further include selection component 750 and handover component 760. Within such embodiment, selection component 750 may be configured to select an alternative frequency from the plurality of candidate frequencies in response to the failed handover attempt, whereas handover component 760 may be configured to establish a communication with the second wireless network via the alternative frequency. In a particular aspect, it should be noted that selection component 750 may be configured to prioritize the plurality of candidate frequencies. For instance, selection component 750 may be configured to prioritize the candidate frequencies based on a most recently used determination of such frequencies. Moreover, for this particular embodiment, selection component 750 may be configured to utilize the most recently used determination to ascertain a most recently used frequency in response to a reconnect failure via an initial frequency included in a redirection message.

Figure 8:
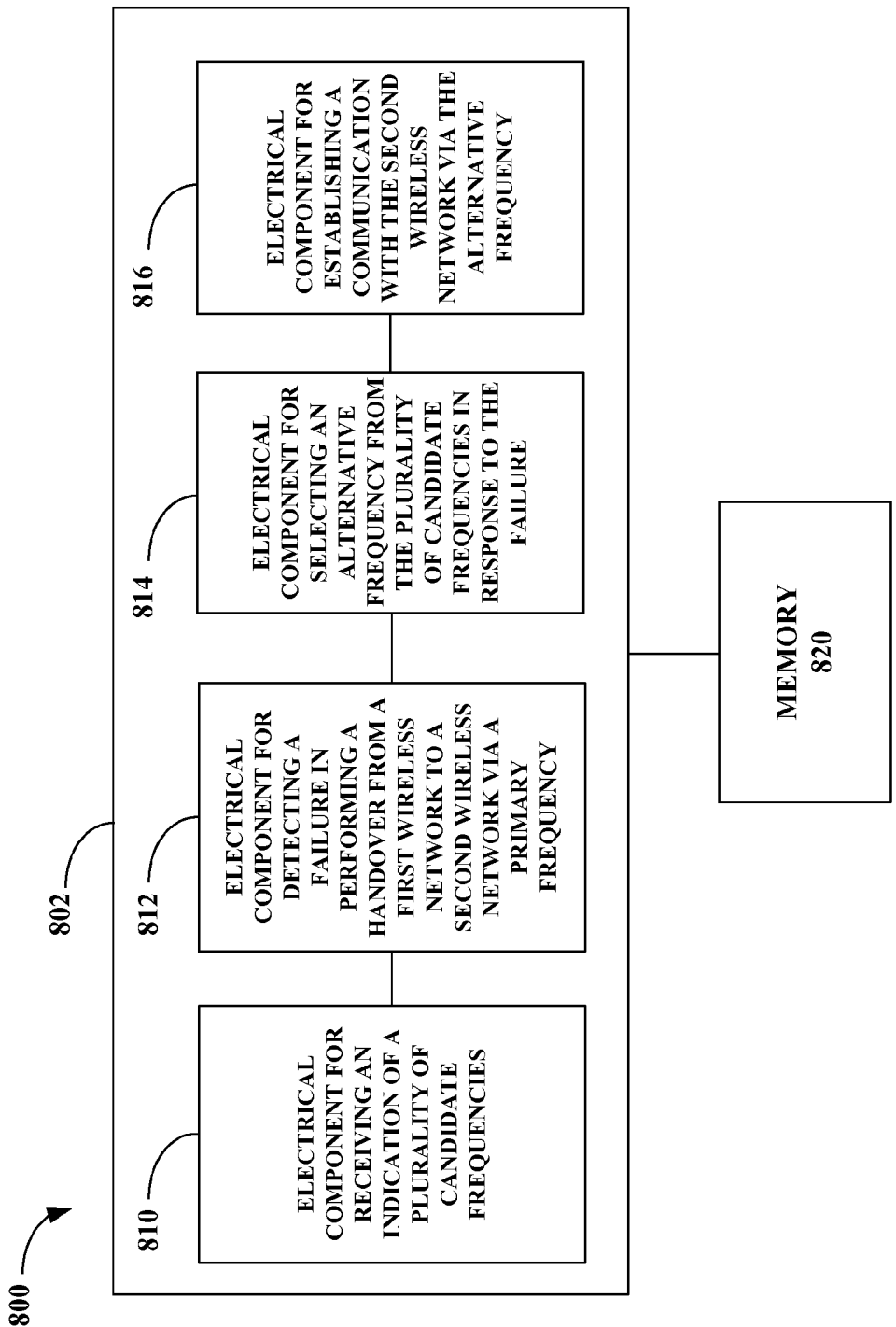
FIG. 8 is an illustration of a second exemplary coupling of electrical components that effectuate redirecting wireless terminals between wireless networks according to an embodiment.

Referring next to FIG. 8, illustrated is an exemplary system 800 that facilitates redirecting wireless terminals between wireless networks according to an embodiment. System 800 and/or instructions for implementing system 800 can physically reside within user equipment (e.g., wireless terminal 700), for instance, wherein system 800 includes functional blocks that can represent functions implemented by a processor using instructions and/or data from a computer readable storage medium. System 800 includes a logical grouping 802 of electrical components that can act in conjunction similar to logical grouping 502 in system 500. As illustrated, logical grouping 802 can include an electrical component for receiving an indication of a plurality of candidate frequencies 810, as well as an electrical component for detecting a failure in performing a handover from a first wireless network to a second wireless network via a primary frequency 812. Logical grouping 802 can also include an electrical component for selecting an alternative frequency from the plurality of candidate frequencies in response to the failure 814. Further, logical grouping 802 can include an electrical component for establishing a communication with the second wireless network via the alternative frequency 816. Additionally, system 800 can include a memory 820 that retains instructions for executing functions associated with electrical components 810, 812, 814, and 816. While shown as being external to memory 820, it is to be understood that electrical components 810, 812, 814, and 816 can exist within memory 820.

Figure 9:
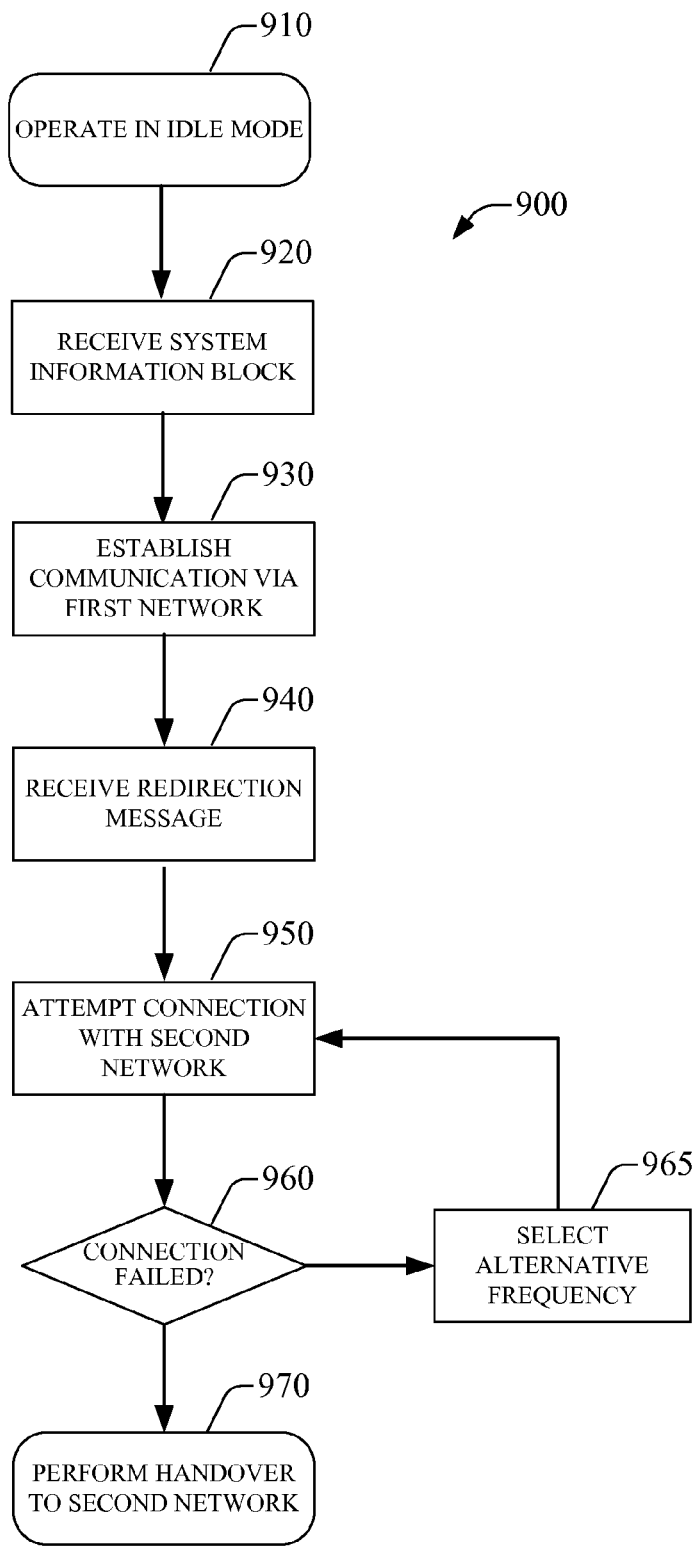
FIG. 9 is a flow diagram of a second exemplary methodology for redirecting wireless terminals between wireless networks in accordance with an aspect of the subject specification.

Referring next to FIG. 9, a flow chart illustrating an exemplary method for facilitating a redirection of wireless terminals between wireless networks is provided. As illustrated, process 900 includes a series of acts that may be performed within user equipment (e.g., wireless terminal 700) according to an aspect of the subject specification. For instance, process 900 may be implemented by employing a processor to execute computer executable instructions stored on a computer readable storage medium to implement the series of acts. In another embodiment, a computer-readable storage medium comprising code which causes at least one computer to implement the acts of process 900 are contemplated.

In an aspect, process 900 begins with the user equipment operating in idle mode at act 910. In a particular embodiment, candidate frequencies for redirecting the user equipment to another network are included in a type eight system information block, which is received at act 920 while the user equipment is operating in idle mode.

At act 930, process 900 proceeds with a communication being established with a first network. In an aspect, such communication may include a voice communication established via an LTE network. As mentioned previously, however, pockets of LTE networks are currently deployed within third generation networks. Therefore, it is contemplated that a redirection message is received at act 940 once the user equipment approaches an edge of such LTE network coverage.

Upon receiving the redirection message, the user equipment then attempts a connection with the second network (e.g., a third generation network) at act 950. Process 900 then continues at act 960 with a determination of whether the connection attempt was successful. In a particular embodiment, it is contemplated that the redirection message identifies a single frequency for the user equipment to use in attempting to connect to the second network. Within such embodiment, if the single frequency identified in the redirection message fails, process 900 proceeds to act 965 where an alternative frequency is selected from a set of candidate frequencies previously identified in the type eight system information block received at act 920. Process 900 then loops back to act 950 where the user equipment attempts to connect to the second network via the alternative frequency. In an aspect, it is contemplated that process 900 may select additional alternative frequencies, as necessary, if attempts to connect to the second network continue to fail at act 960. Here, it is contemplated that the alternative frequencies included in the type eight system information block may be prioritized such that the user equipment first attempts to connect to the second network via the higher prioritized alternative frequencies. Once the connection to the second network is successful, process 900 concludes with the handover to the second network being completed at act 970.

In another embodiment, rather than receiving alternative frequencies via the type eight system information block, the redirection message itself identifies such alternative frequencies. Moreover, the alternative frequencies selected at act 965 are identified in the redirection message received at act 940. Here, it is again contemplated that the alternative frequencies may be prioritized such that the user equipment first attempts to connect to the second network via the higher prioritized alternative frequencies.

Exemplary Communication System

Figure 10:
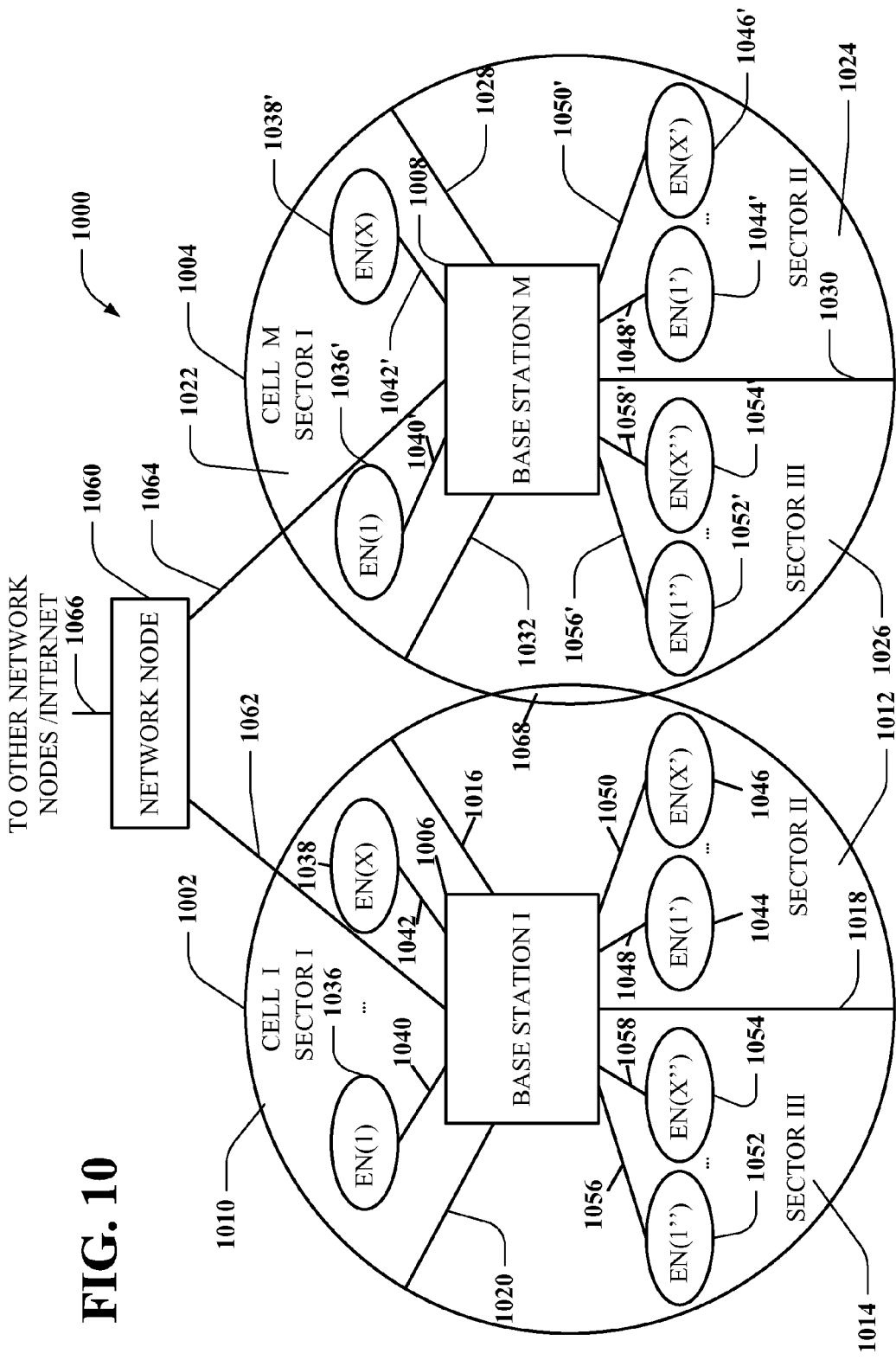
FIG. 10 is an illustration of an exemplary communication system implemented in accordance with various aspects including multiple cells.

Referring next to FIG. 10, an exemplary communication system 1000 having multiple cells (e.g., cell 1002, cell 1004) is illustrated. Here, it should be noted that neighboring cells 1002, 1004 overlap slightly, as indicated by cell boundary region 1068, thereby creating potential for signal interference between signals transmitted by base stations in neighboring cells. Each cell 1002, 1004 of system 1000 includes three sectors. Cells which have not been subdivided into multiple sectors (N=1), cells with two sectors (N=2) and cells with more than 3 sectors (N>3) can also be utilized. Cell 1002 includes a first sector, sector I 1010, a second sector, sector II 1012, and a third sector, sector III 1014. Each sector 1010, 1012, and 1014 has two sector boundary regions; each boundary region is shared between two adjacent sectors.

Interference between signals transmitted by base stations in neighboring sectors can occur in boundary regions. Line 1016 represents a sector boundary region between sector I 1010 and sector II 1012; line 1018 represents a sector boundary region between sector II 1012 and sector III 1014; line 1020 represents a sector boundary region between sector III 1014 and sector I 1010. Similarly, cell M 1004 includes a first sector, sector I 1022, a second sector, sector II 1024, and a third sector, sector III 1026. Line 1028 represents a sector boundary region between sector I 1022 and sector II 1024; line 1030 represents a sector boundary region between sector II 1024 and sector III 1026; line 1032 represents a boundary region between sector III 1026 and sector I 1022. Cell I 1002 includes a base station (BS), base station I 1006, and a plurality of end nodes (ENs) in each sector 1010, 1012, 1014. Sector I 1010 includes EN(1) 1036 and EN(X) 1038 coupled to BS 1006 via wireless links 1040, 1042, respectively; sector II 1012 includes EN(1') 1044 and EN(X') 1046 coupled to BS 1006 via wireless links 1048, 1050, respectively; sector III 1014 includes EN(1") 1052 and EN(X") 1054 coupled to BS 1006 via wireless links 1056, 1058, respectively. Similarly, cell M 1004 includes base station M 1008, and a plurality of end nodes (ENs) in each sector 1022, 1024, and 1026. Sector I 1022 includes EN(1) 1036' and EN(X) 1038' coupled to BS M 1008 via wireless links 1040', 1042', respectively; sector II 1024 includes EN(1') 1044' and EN(X') 1046' coupled to BS M 1008 via wireless links 1048', 1050', respectively; sector III 1026 includes EN(1") 1052' and EN(X") 1054' coupled to BS 1008 via wireless links 1056', 1058', respectively.

System 1000 also includes a network node 1060 which is coupled to BS I 1006 and BS M 1008 via network links 1062, 1064, respectively. Network node 1060 is also coupled to other network nodes, e.g., other base stations, AAA server nodes, intermediate nodes, routers, etc. and the Internet via network link 1066. Network links 1062, 1064, 1066 may be, e.g., fiber optic cables. Each end node, e.g. EN 1 1036 may be a wireless terminal including a transmitter as well as a receiver. The wireless terminals, e.g., EN(1) 1036 may move through system 1000 and may communicate via wireless links with the base station in the cell in which the EN is currently located. The wireless terminals, (WTs), e.g. EN(1) 1036, may communicate with peer nodes, e.g., other WTs in system 1000 or outside system 1000 via a base station, e.g. BS 1006, and/or network node 1060. WTs, e.g., EN(1) 1036 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 11:
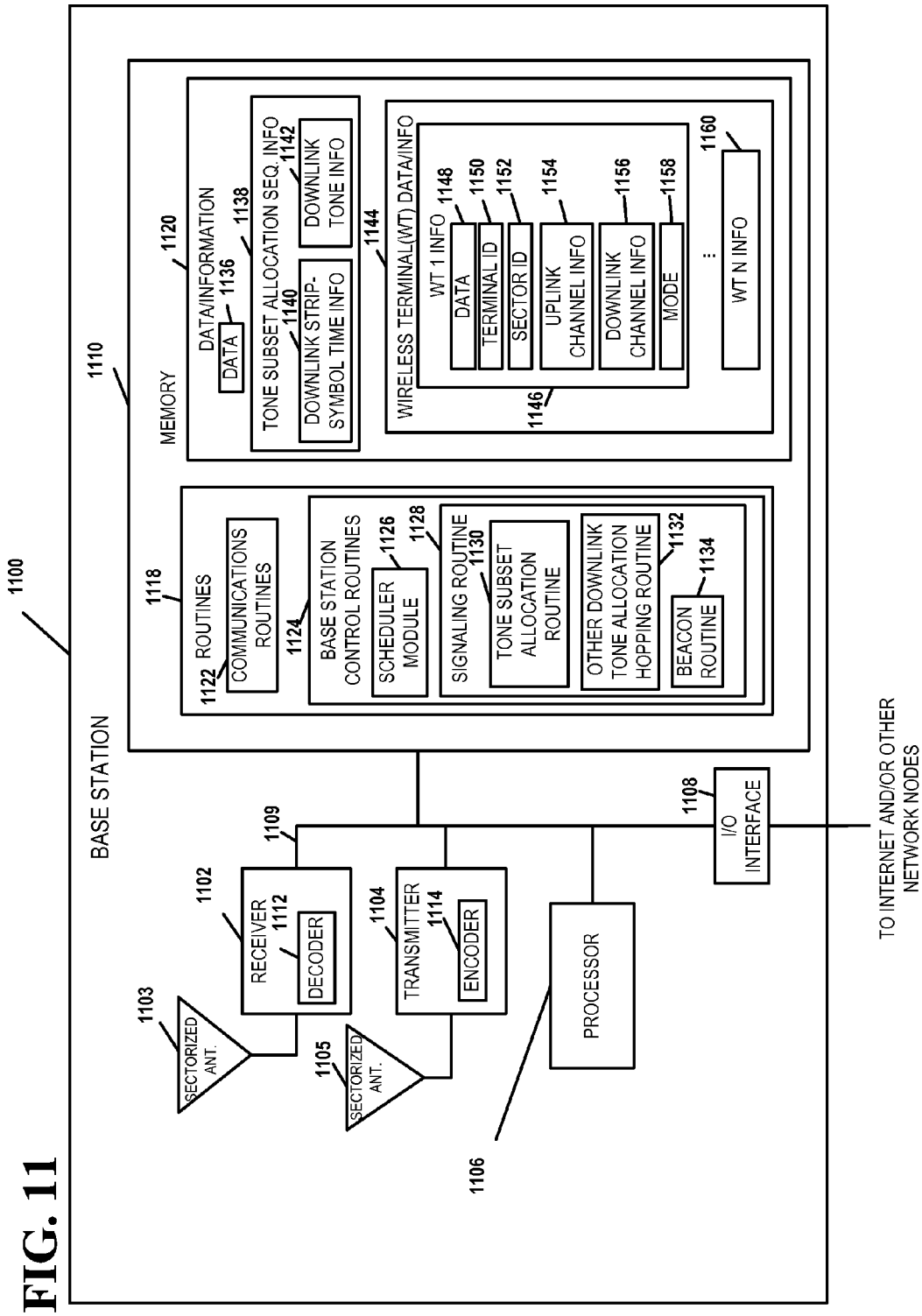
FIG. 11 is an illustration of an exemplary base station in accordance with various aspects described herein.

FIG. 11 illustrates an example base station 1100. Base station 1100 implements tone subset allocation sequences, with different tone subset allocation sequences generated for respective different sector types of the cell. Base station 1100 may be used as any one of base stations 1006, 1008 of the system 1000 of FIG. 10. The base station 1100 includes a receiver 1102, a transmitter 1104, a processor 1106, e.g., CPU, an input/output interface 1108 and memory 1110 coupled together by a bus 1109 over which various elements 1102, 1104, 1106, 1108, and 1110 may interchange data and information.

Sectorized antenna 1103 coupled to receiver 1102 is used for receiving data and other signals, e.g., channel reports, from wireless terminals transmissions from each sector within the base station's cell. Sectorized antenna 1105 coupled to transmitter 1104 is used for transmitting data and other signals, e.g., control signals, pilot signal, beacon signals, etc. to wireless terminals 1200 (see FIG. 12) within each sector of the base station's cell. In various aspects, base station 1100 may employ multiple receivers 1102 and multiple transmitters 1104, e.g., an individual receivers 1102 for each sector and an individual transmitter 1104 for each sector. Processor 1106, may be, e.g., a general purpose central processing unit (CPU). Processor 1106 controls operation of base station 1100 under direction of one or more routines 1118 stored in memory 1110 and implements the methods. I/O interface 1108 provides a connection to other network nodes, coupling the BS 1100 to other base stations, access routers, AAA server nodes, etc., other networks, and the Internet. Memory 1110 includes routines 1118 and data/information 1120.

Data/information 1120 includes data 1136, tone subset allocation sequence information 1138 including downlink strip-symbol time information 1140 and downlink tone information 1142, and wireless terminal (WT) data/info 1144 including a plurality of sets of WT information: WT 1 info 1146 and WT N info 1160. Each set of WT info, e.g., WT 1 info 1146 includes data 1148, terminal ID 1150, sector ID 1152, uplink channel information 1154, downlink channel information 1156, and mode information 1158.

Routines 1118 include communications routines 1122 and base station control routines 1124. Base station control routines 1124 includes a scheduler module 1126 and signaling routines 1128 including a tone subset allocation routine 1130 for strip-symbol periods, other downlink tone allocation hopping routine 1132 for the rest of symbol periods, e.g., non strip-symbol periods, and a beacon routine 1134.

Data 1136 includes data to be transmitted that will be sent to encoder 1114 of transmitter 1104 for encoding prior to transmission to WTs, and received data from WTs that has been processed through decoder 1112 of receiver 1102 following reception. Downlink strip-symbol time information 1140 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1142 includes information including a carrier frequency assigned to the base station 1100, the number and frequency of tones, and the set of tone subsets to be allocated to the strip-symbol periods, and other cell and sector specific values such as slope, slope index and sector type.

Data 1148 may include data that WT1 1200 has received from a peer node, data that WT 1 1200 desires to be transmitted to a peer node, and downlink channel quality report feedback information. Terminal ID 1150 is a base station 1100 assigned ID that identifies WT 1 1200. Sector ID 1152 includes information identifying the sector in which WT1 1200 is operating. Sector ID 1152 can be used, for example, to determine the sector type. Uplink channel information 1154 includes information identifying channel segments that have been allocated by scheduler 1126 for WT1 1200 to use, e.g., uplink traffic channel segments for data, dedicated uplink control channels for requests, power control, timing control, etc. Each uplink channel assigned to WT1 1200 includes one or more logical tones, each logical tone following an uplink hopping sequence. Downlink channel information 1156 includes information identifying channel segments that have been allocated by scheduler 1126 to carry data and/or information to WT1 1200, e.g., downlink traffic channel segments for user data. Each downlink channel assigned to WT1 1200 includes one or more logical tones, each following a downlink hopping sequence. Mode information 1158 includes information identifying the state of operation of WT1 1200, e.g. sleep, hold, on.

Communications routines 1122 are utilized by base station 1100 to perform various communications operations and implement various communications protocols. Base station control routines 1124 are used to control the base station 1100 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1128 controls the operation of receiver 1102 with its decoder 1112 and transmitter 1104 with its encoder 1114. The signaling routine 1128 is responsible controlling the generation of transmitted data 1136 and control information. Tone subset allocation routine 1130 constructs the tone subset to be used in a strip-symbol period using the method of the aspect and using data/info 1120 including downlink strip-symbol time info 1140 and sector ID 1152. The downlink tone subset allocation sequences will be different for each sector type in a cell and different for adjacent cells. The WTs 1200 receive the signals in the strip-symbol periods in accordance with the downlink tone subset allocation sequences; the base station 1100 uses the same downlink tone subset allocation sequences in order to generate the transmitted signals. Other downlink tone allocation hopping routine 1132 constructs downlink tone hopping sequences, using information including downlink tone information 1142, and downlink channel information 1156, for the symbol periods other than the strip-symbol periods. The downlink data tone hopping sequences are synchronized across the sectors of a cell. Beacon routine 1134 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 12:
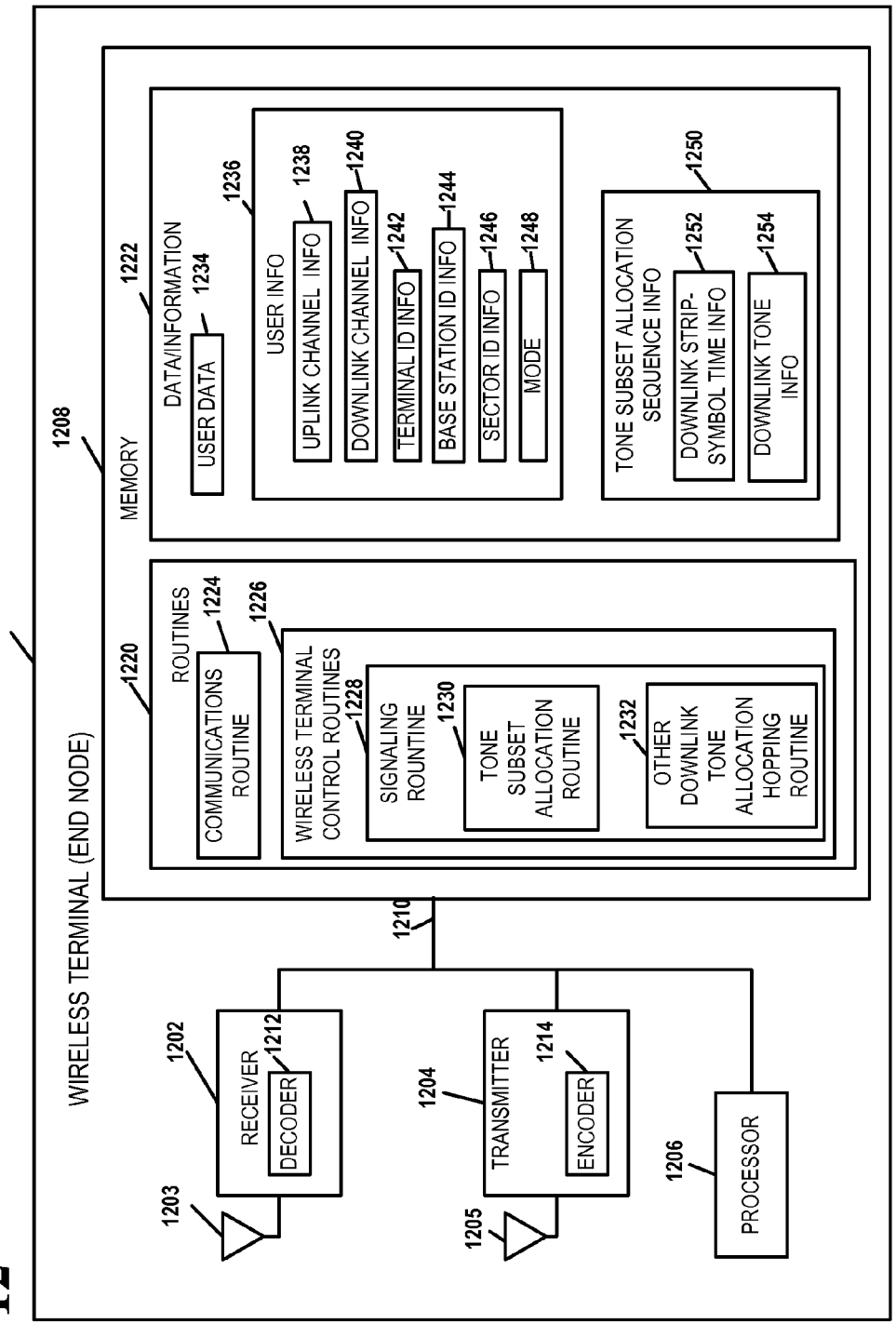
FIG. 12 is an illustration of an exemplary wireless terminal implemented in accordance with various aspects described herein.

FIG. 12 illustrates an example wireless terminal (end node) 1200 which can be used as any one of the wireless terminals (end nodes), e.g., EN(1) 1036, of the system 1000 shown in FIG. 10. Wireless terminal 1200 implements the tone subset allocation sequences. The wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. An antenna 1203 used for receiving signals from a base station (and/or a disparate wireless terminal) is coupled to receiver 1202. An antenna 1205 used for transmitting signals, e.g., to a base station (and/or a disparate wireless terminal) is coupled to transmitter 1204.

The processor 1206, e.g., a CPU controls the operation of the wireless terminal 1200 and implements methods by executing routines 1220 and using data/information 1222 in memory 1208.

Data/information 1222 includes user data 1234, user information 1236, and tone subset allocation sequence information 1250. User data 1234 may include data, intended for a peer node, which will be routed to encoder 1214 for encoding prior to transmission by transmitter 1204 to a base station, and data received from the base station which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by a base station for wireless terminal 1200 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1240 includes information identifying downlink channel segments that have been assigned by a base station to WT 1200 for use when the base station is transmitting data/information to WT 1200. Downlink channels may include downlink traffic channels and assignment channels, each downlink channel including one or more logical tone, each logical tone following a downlink hopping sequence, which is synchronized between each sector of the cell.

User info 1236 also includes terminal ID information 1242, which is a base station-assigned identification, base station ID information 1244 which identifies the specific base station that WT has established communications with, and sector ID info 1246 which identifies the specific sector of the cell where WT 1200 is presently located. Base station ID 1244 provides a cell slope value and sector ID info 1246 provides a sector index type; the cell slope value and sector index type may be used to derive tone hopping sequences. Mode information 1248 also included in user info 1236 identifies whether the WT 1200 is in sleep mode, hold mode, or on mode.

Tone subset allocation sequence information 1250 includes downlink strip-symbol time information 1252 and downlink tone information 1254. Downlink strip-symbol time information 1252 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1254 includes information including a carrier frequency assigned to the base station, the number and frequency of tones, and the set of tone subsets to be allocated to the strip-symbol periods, and other cell and sector specific values such as slope, slope index and sector type.

Routines 1220 include communications routines 1224 and wireless terminal control routines 1226. Communications routines 1224 control the various communications protocols used by WT 1200. Wireless terminal control routines 1226 controls basic wireless terminal 1200 functionality including the control of the receiver 1202 and transmitter 1204. Wireless terminal control routines 1226 include the signaling routine 1228. The signaling routine 1228 includes a tone subset allocation routine 1230 for the strip-symbol periods and an other downlink tone allocation hopping routine 1232 for the rest of symbol periods, e.g., non strip-symbol periods. Tone subset allocation routine 1230 uses user data/info 1222 including downlink channel information 1240, base station ID info 1244, e.g., slope index and sector type, and downlink tone information 1254 in order to generate the downlink tone subset allocation sequences in accordance with some aspects and process received data transmitted from the base station. Other downlink tone allocation hopping routine 1232 constructs downlink tone hopping sequences, using information including downlink tone information 1254, and downlink channel information 1240, for the symbol periods other than the strip-symbol periods. Tone subset allocation routine 1230, when executed by processor 1206, is used to determine when and on which tones the wireless terminal 1200 is to receive one or more strip-symbol signals from the base station 1100. The uplink tone allocation hopping routine 1232 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method for wireless communication, the method comprising:
   monitoring, by a first wireless network, a coverage quality of a user equipment within the first wireless network;
   ascertaining, by the first wireless network, a plurality of candidate frequencies in response to the coverage quality, wherein the first wireless network is a long term evolution network, wherein a communication between the user equipment and a second wireless network is facilitated by the plurality of candidate frequencies, wherein the second wireless network is a third generation network; and
   communicating, by the first wireless network, the plurality of candidate frequencies to the user equipment within a redirection message configured to redirect the user equipment to the second wireless network or within a system information block that is communicated during an idle mode of the user equipment, wherein the plurality of candidate frequencies includes different frequency channels or bands that are associated with different carriers within at least one sector, wherein the ascertaining further comprises prioritizing the plurality of candidate frequencies, wherein the prioritizing is based on a most recently used determination of the plurality of candidate frequencies, and wherein the most recently used determination is utilized to select a most recently used frequency in response to a failure of an initial frequency.

2. The method of claim 1, wherein the monitoring comprises evaluating a set of measurements received from the user equipment.

3. The method of claim 2, wherein the set of measurements is associated with Channel Quality Indicator measurements.

4. The method of claim 1, wherein the monitoring comprises comparing the coverage quality to a threshold.

5. The method of claim 4, wherein the ascertaining is performed in response to the coverage quality falling below the threshold.

6. The method of claim 4, wherein the communicating is performed in response to the coverage quality falling below the threshold.

7. An apparatus, comprising:
   a processor of a node of a first wireless network, the processor configured to execute computer executable components stored in memory, the components including:
   a monitoring component configured to monitor a coverage quality of a user equipment within the first wireless network, wherein the first wireless network is a long term evolution network;
   a selection component configured to ascertain a plurality of candidate frequencies in response to the coverage quality, wherein a communication between the user equipment and a second wireless network is facilitated by the plurality of candidate frequencies, wherein the second wireless network is a third generation network; and
   a communication component configured to communicate the plurality of candidate frequencies to the user equipment within a redirection message configured to redirect the user equipment to the second wireless network or within a system information block that is communicated during an idle mode of the user equipment, wherein the plurality of candidate frequencies includes different frequency channels or bands that are associated with different carriers within at least one sector, wherein the selection component is configured to prioritize the plurality of candidate frequencies, wherein the selection component is configured to prioritize the plurality of candidate frequencies based on a most recently used determination of the plurality of candidate frequencies, and wherein the selection component is further configured to utilize the most recently used determination to select a most recently used frequency in response to a failure of an initial frequency.

8. The apparatus of claim 7, wherein the monitoring component is configured to evaluate a set of measurements received from the user equipment.

9. The apparatus of claim 8, wherein the set of measurements is associated with Channel Quality Indicator measurements.

10. The apparatus of claim 7, wherein the monitoring component is configured to compare the coverage quality to a threshold.

11. The apparatus of claim 10, wherein the selection component is configured to determine the plurality of candidate frequencies in response to the coverage quality falling below the threshold.

12. The apparatus of claim 10, wherein the communication component is configured to communicate the plurality of candidate frequencies in response to the coverage quality falling below the threshold.

13. A computer program product, comprising: a non-transitory computer-readable storage medium comprising code for causing at least one computer of a node of a first wireless network to:
monitor a coverage quality of a user equipment within the first wireless network, wherein the first wireless network is a long term evolution network; ascertain a plurality of candidate frequencies in response to the coverage quality, wherein a communication between the user equipment and a second wireless network is facilitated by the plurality of candidate frequencies, wherein the second wireless network is a third generation network; and communicate the plurality of candidate frequencies to the user equipment within a redirection message configured to redirect the user equipment to the second wireless network or within a system information block that is communicated during an idle mode of the user equipment, wherein the plurality of candidate frequencies includes different frequency channels or bands that are associated with different carriers within at least one sector, wherein the code causes the at least one computer to prioritize the plurality of candidate frequencies, wherein the code causes the at least one computer to prioritize the plurality of candidate frequencies based on a most recently used determination of the plurality of candidate frequencies, and wherein the code further causes the at least one computer to utilize the most recently used determination to select a most recently used frequency in response to a failure of an initial frequency.

14. The computer-readable medium of claim 13, wherein the code causes the at least one computer to evaluate a set of measurements received from the user equipment.

15. The computer-readable medium of claim 14, wherein the set of measurements is associated with Channel Quality Indicator measurements.

16. The computer-readable medium of claim 13, wherein the code causes the at least one computer to compare the coverage quality to a threshold.

17. The computer-readable medium of claim 16, wherein the code causes the at least one computer to determine the plurality of candidate frequencies in response to the coverage quality falling below the threshold.

18. The computer-readable medium of claim 16, wherein the code causes the at least one computer to communicate the plurality of candidate frequencies in response to the coverage quality falling below the threshold.

19. An apparatus at a node of a first wireless network, the apparatus comprising:
means for monitoring, at the node, a coverage quality of a user equipment within the first wireless network, wherein the first wireless network is a long term evolution network;
means for ascertaining, at the node, a plurality of candidate frequencies in response to the coverage quality, wherein a communication between the user equipment and a second wireless network is facilitated by the plurality of candidate frequencies, wherein the second wireless network is a third generation network; and
means for communicating, by the node, the plurality of candidate frequencies to the user equipment within a redirection message configured to redirect the user equipment to the second wireless network or within a system information block that is communicated during an idle mode of the user equipment, wherein the plurality of candidate frequencies includes different frequency channels or bands that are associated with different carriers within at least one sector, wherein the means for ascertaining is configured to prioritize the plurality of candidate frequencies, wherein the means for ascertaining is configured to prioritize the plurality of candidate frequencies based on a most recently used determination of the plurality of candidate frequencies, and wherein the means for ascertaining is further configured to utilize the most recently used determination to select a most recently used frequency in response to a failure of an initial frequency.

20. A method for wireless communications, comprising:
receiving, at a terminal, from a first wireless network, an indication of a plurality of candidate frequencies within a redirection message configured to redirect the terminal to a second wireless network or within a system information block that is communicated during an idle mode of the terminal, wherein the plurality of candidate frequencies includes different frequency channels or bands that are associated with different carriers within at least one sector, wherein the first wireless network is a long term evolution network, wherein the second wireless network is a third generation network;
detecting, by the terminal, a failure in performing a handover from the first wireless network to the second wireless network, wherein the handover is attempted via a primary frequency;
selecting, by the terminal, an alternative frequency from the plurality of candidate frequencies in response to the failure; and
establishing, by the terminal, a communication with the second wireless network via the alternative frequency, wherein the selecting further comprises prioritizing the plurality of candidate frequencies, wherein the prioritizing is based on a most recently used determination of the plurality of candidate frequencies, and wherein the most recently used determination is utilized to select a most recently used frequency in response to a reconnect failure via an initial frequency.

21. A wireless communication terminal, comprising:
a processor configured to execute computer executable components stored in memory, the components including:
a receiving component configured to receive an indication of a plurality of candidate frequencies from a first wireless network within a redirection message configured to redirect the terminal to a second wireless network or within a system information block that is communicated during an idle mode of the terminal, wherein the plurality of candidate frequencies includes different frequency channels or bands that are associated with different carriers within at least one sector, wherein the first wireless network is a long term evolution network, wherein the second wireless network is a third generation network;
a detection component configured to detect a failure in performing a handover from the first wireless network to the second wireless network, wherein the handover is attempted via a primary frequency;
a selection component configured to select an alternative frequency from the plurality of candidate frequencies in response to the failure; and
a handover component configured to establish a communication with the second wireless network via the alternative frequency, wherein the selection component is configured to prioritize the plurality of candidate frequencies, wherein the selection component is configured to prioritize the plurality of candidate frequencies based on a most recently used determination of the plurality of candidate frequencies, and wherein the selection component is further configured to utilize the most recently used determination to ascertain a most recently used frequency in response to a reconnect failure via an initial frequency.

22. A non-transitory computer-readable storage medium comprising code for causing at least one computer of a wireless communication terminal to:
receive, from a first wireless network, an indication of a plurality of candidate frequencies within a redirection message configured to redirect the terminal to a second wireless network or within a system information block that is communicated during an idle mode of the terminal, wherein the plurality of candidate frequencies includes different frequency channels or bands that are associated with different carriers within at least one sector, wherein the first wireless network is a long term evolution network, wherein the second wireless network is a third generation network; detect a failure in performing a handover from the first wireless network to the second wireless network, wherein the handover is attempted via a primary frequency;
select an alternative frequency from the plurality of candidate frequencies in response to the failure; and establish a communication with the second wireless network via the alternative frequency, wherein the code causes the at least one computer to prioritize the plurality of candidate frequencies, wherein the code causes the at least one computer to prioritize the plurality of candidate frequencies based on a most recently used determination of the plurality of candidate frequencies, and wherein the code further causes the at least one computer to utilize the most recently used determination to ascertain a most recently used frequency in response to a reconnect failure via an initial frequency.

23. An apparatus in a wireless communication terminal, the apparatus comprising:
means for receiving, at the terminal, an indication of a plurality of candidate frequencies from a first wireless network within a redirection message configured to redirect the terminal to a second wireless network or within a system information block that is communicated during an idle mode of the terminal, wherein the plurality of candidate frequencies includes different frequency channels or bands that are associated with different carriers within at least one sector, wherein the first wireless network is a long term evolution network, wherein the second wireless network is a third generation network;
means for detecting, by the terminal, a failure in performing a handover from a first wireless network to a second wireless network, wherein the handover is attempted via a primary frequency;
means for selecting, by the terminal, an alternative frequency from the plurality of candidate frequencies in response to the failure; and
means for establishing, by the terminal, a communication with the second wireless network via the alternative frequency, wherein the means for selecting is configured to prioritize the plurality of candidate frequencies, wherein the means for selecting is configured to prioritize the plurality of candidate frequencies based on a most recently used determination of the plurality of candidate frequencies, and wherein the means for selecting is further configured to utilize the most recently used determination to ascertain a most recently used frequency in response to a reconnect failure via an initial frequency.

* * * * *